(12) United States Patent
McClatchie

(10) Patent No.: US 8,854,420 B2
(45) Date of Patent: *Oct. 7, 2014

(54) HIGH-RESOLUTION, VARIABLE DEPTH OF FIELD IMAGE DEVICE

(71) Applicant: Google Inc., Mountain View, CA (US)

(72) Inventor: Iain Richard Tyrone McClatchie, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,464

(22) Filed: Nov. 26, 2012

(65) Prior Publication Data

US 2013/0141522 A1    Jun. 6, 2013

Related U.S. Application Data

(63) Continuation of application No. 12/345,153, filed on Dec. 29, 2008, now Pat. No. 8,319,822.

(60) Provisional application No. 61/016,950, filed on Dec. 27, 2007.

(51) Int. Cl.
| | |
|---|---|
| *H04N 9/64* | (2006.01) |
| *H04N 5/225* | (2006.01) |
| *H04N 9/04* | (2006.01) |
| *H04N 5/217* | (2011.01) |
| *H04N 5/232* | (2006.01) |

(52) U.S. Cl.
CPC ......... *H04N 5/23238* (2013.01); *H04N 5/2258* (2013.01); *H04N 9/045* (2013.01); *H04N 5/217* (2013.01); *H04N 5/23229* (2013.01)
USPC .......................................................... 348/33

(58) Field of Classification Search
USPC .......................................................... 348/33
See application file for complete search history.

(56) References Cited

U.S. PATENT DOCUMENTS

| | | | |
|---|---|---|---|
| 6,097,835 A | 8/2000 | Lindgren | |
| 6,694,064 B1 | 2/2004 | Benkelman | |

(Continued)

FOREIGN PATENT DOCUMENTS

CN           1556374 A    12/2004

OTHER PUBLICATIONS

Andrews, Robert J. and Lovell, Brian C., "Color Optical Flow," *Proceedings of the 2003 APRS Workshop on Digital Image Computing*, pp. 135-139, 2003.

(Continued)

*Primary Examiner* — Larry Donaghue
*Assistant Examiner* — Marshall McLeod
(74) *Attorney, Agent, or Firm* — Lerner, David, Littenberg, Krumholz & Mentlik, LLP

(57) ABSTRACT

A high-resolution image device that is used to receive images in a variable depth of field environment may include a color image sensor, a panchromatic image sensor, and a measuring device. The color image sensor may be configured to receive a color image of an object. Similarly, a synchronous panchromatic image may be received by the panchromatic image sensor. The image device may be configured to replace a luminance component from the original color image with a luminance component from the panchromatic image. The measuring device may be configured to measure a distance between the image sensors and the object, such that the image device may be configured to use the distance to account for the effect of parallax.

18 Claims, 7 Drawing Sheets

(56) References Cited

U.S. PATENT DOCUMENTS

| 2004/0012670 | A1 | 1/2004 | Zhang |
| 2004/0027347 | A1 | 2/2004 | Farsaie |
| 2004/0264796 | A1 | 12/2004 | Turner et al. |
| 2007/0188601 | A1 | 8/2007 | Rohaly et al. |
| 2007/0206241 | A1 | 9/2007 | Smith et al. |
| 2007/0206242 | A1 | 9/2007 | Smith |

OTHER PUBLICATIONS

"Earthmine—Applications," Earthmine Inc., accessed at www.earthmine.com/applications, accessed on May 28, 2009, 1 page, published on Dec. 26, 2007.

"Earthmine—Company," Earthmine Inc., accessed at www.earthmine.com/company, accessed May 28, 2009, 1 page, published on Dec. 26, 2007.

"Earthmine—Products," Earthmine Inc., accessed at www.earthmine.com/products, accessed on May 28, 2009, 1 page, published on Dec. 26, 2007.

Ehlers, Manfred and Welch, R., "Stereocorrelation of Landsat TM Images," *Photgrammetric Engineering and Remote Sensing*, vol. 53, No. 9, pp. 1231-1237, American Society of Photogrammetry and Remote Sensing, 1987.

Horn, Berthold K.P. and Schunck, Brian G., "Determining Optical Flow," *Artificial Intelligence*, vol. 17, pp. 185-203, Aug. 1981.

"Microsoft Ultracam Digital Aerial Camera—Features," Microsoft Corp., accessed at www.microsoft.com/utlracam/ultracam/features.mspx, accessed on Jun. 8, 2009, 3 pages, published on Feb. 13, 2008.

"Microsoft Ultracam Digital Aerial Camera—Technical," Microsoft Corp., accessed at www.microsoft/com/ultracam/ultracam/tech.mspx, accessed on Jun. 8, 2009, 3 pages, published on Feb. 14, 2008.

Triggs, Bill et al., "Bundle Adjustment—A Modern Synthesis," *Vision Algorithms '99, LNCS 1883*, pp. 298-372, Springer-Verlag Berlin Heidelberg, 2000.

Yuan, Xiuxiao et al., "Image Orientation by Combined Bundle Adjustment with Fixed Imageries," *Proceedings of the International Society for Photogrammertry and Remote Sensing*, vol. XXXV, 5 pages, 1994.

"Z/I Imaging Digital Mapping Camera (DMC)," Digital Mapping, Inc., accessed at www.admap.com/dmc.html, accessed on Jun. 8, 2009, 5 pages, published on Jul. 13, 2007.

European Search Report for European Patent Application No. 08 86 8295, European Patent Office, Netherlands, 7 pages, mailed Jan. 23, 2012.

International Search Report and Written Opinon for International Patent Application No. PCT/US2008/014077, 10 pages, mailed Feb. 20, 2009.

European Examination Report for Application No. 08868295.0 dated Decmeber 13, 2013.

HIGH-RESOLUTION, VARIABLE DEPTH OF FIELD IMAGE DEVICE

CROSS REFERENCE TO RELATED APPLICATION

The present application is a continuation of U.S. patent application Ser. No. 12/345,153, filed Dec. 29, 2008, which claims the benefit of U.S. Provisional Application No. 61/016,950, filed Dec. 27, 2007, titled "High-Resolution, Variable Depth of Field Image Device," which are incorporated herein by reference in their entirety.

BACKGROUND

1. Field

Embodiments of the present invention generally relate to the field of high-resolution imagery. More specifically, the present invention refers to the generation of high-resolution images in a variable depth of field environment.

2. Background

Many satellite sensors provide high-resolution panchromatic (black and white) imagery along with lower resolution multi-spectral (color) imagery. Image fusion techniques, such as pan sharpening, are used to combine these multiple images into a composite product. More specifically, pan sharpening methods process the multi-spectral image with the coarse spatial resolution into a fine spatial color image by fusing the multi-spectral image with the high-resolution panchromatic image. As a result, the high-resolution color image preserves the original color fidelity and allows for better visualization and interpretation. FIG. 1 illustrates a conventional pan sharpening device 100, where a multi-spectral image sensor 110 is coupled to a panchromatic image sensor 120.

Satellite imagery typically captures images that have a narrow depth of field. Depth of field refers to the range in front of and beyond an object that appears to be in focus. In imagery applications with a narrow depth of field, pan sharpening techniques provide a reliable method to generate high-resolution color images. However, for images with a wide depth of field, the resolution of color images generated from pan sharpening techniques may be degraded. It is desirable to implement techniques to account for a wide depth of field, such that high-resolution images may be generated using pan sharpening methods.

Additionally, resolution may be degraded when near-field images are captured using pan sharpening techniques due to parallax. Parallax refers to a perceived shift of an imaged object against a background caused by the distance between apertures of the panchromatic and multi-spectral image sensors. Existing satellite and other airborne sensors do not have to account for parallax since the focal length between the sensors and the object being imaged (e.g., the ground) is large enough such that the distance between apertures of the panchromatic and multi-spectral image sensors is negligible. When the focal length is decreased, such as in near-field imaging, loss of resolution due to parallax becomes a greater issue.

SUMMARY

In order to obtain high-resolution color images of near- and variable-field objects, the effect of parallax caused by a distance between two separate imaging devices must be reduced. In an embodiment of the present invention, an apparatus for generating a high-resolution image in a wide depth of field environment may include a color image sensor, a panchromatic image sensor, and a measuring device. The measuring device may be configured to measure a distance from the color and panchromatic image sensors to an object, where the distance may be used in accounting for the effect of parallax.

In another embodiment, a method for generating a high-resolution image in a wide depth of field environment may include the following steps: synchronously imaging an object with color and panchromatic image sensors; measuring a distance from the image sensors to the object; and, adjusting an image of the object. In adjusting the image, pixels from an image received by the panchromatic image sensor may be spatially shifted in order to form a resulting panchromatic image with a spatial relationship uniform to a synchronously received color image.

In another embodiment, a system for generating a high-resolution image in a wide depth of field environment may include a processor and a memory. The memory is in communication with the processor and may store processing instructions. These processing instructions may include directing the processor to perform the following functions: synchronously image an object with color and panchromatic image sensors; measure a distance from the color and panchromatic image sensors to the object; and, adjust an image of the object based on the measured distance to account for the effect of parallax. Parallax error may occur when imaging the object due to a spatial difference between apertures of the color and panchromatic image sensors. This embodiment of a high-resolution image system may account for the effect of parallax.

In another embodiment, an apparatus for generating a high-resolution image may include a means for synchronously imaging an object to generate a high-resolution image of the object in a wide depth of field environment. The apparatus may also include a means for measuring a distance from image sensors to the object. Further, the apparatus may include a means for reducing the effect of parallax due to a spatial distance between apertures of the image sensors.

Further embodiments, features, and advantages of the present invention, as well as the structure and operation of the various embodiments are described in detail below with reference to accompanying drawings.

BRIEF DESCRIPTION OF THE DRAWINGS

The present invention is illustrated by way of example, and not by way of limitation, in the figures of the accompanying drawings in which.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In one embodiment, the apparatus and methods described herein may be used with various moving vehicles such as automobiles, boats, and airplanes. Alternatively, the apparatus and methods herein may be used with other types of moving vehicles.

Figure 1:
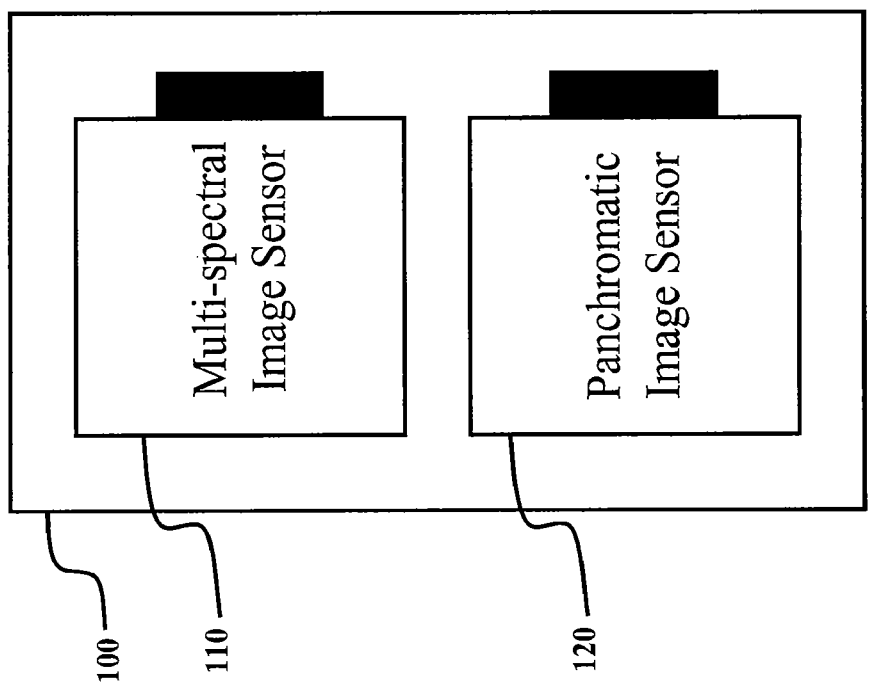
FIG. 1 illustrates a conventional pan sharpening device.
Figure 2:
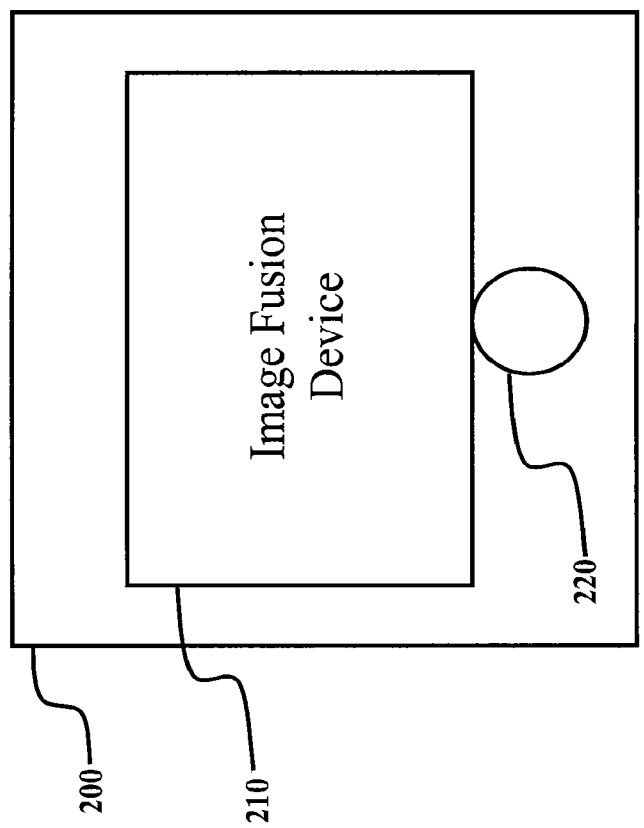
FIG. 2 illustrates one embodiment of a high-resolution, variable depth of field image device.
Figure 3:
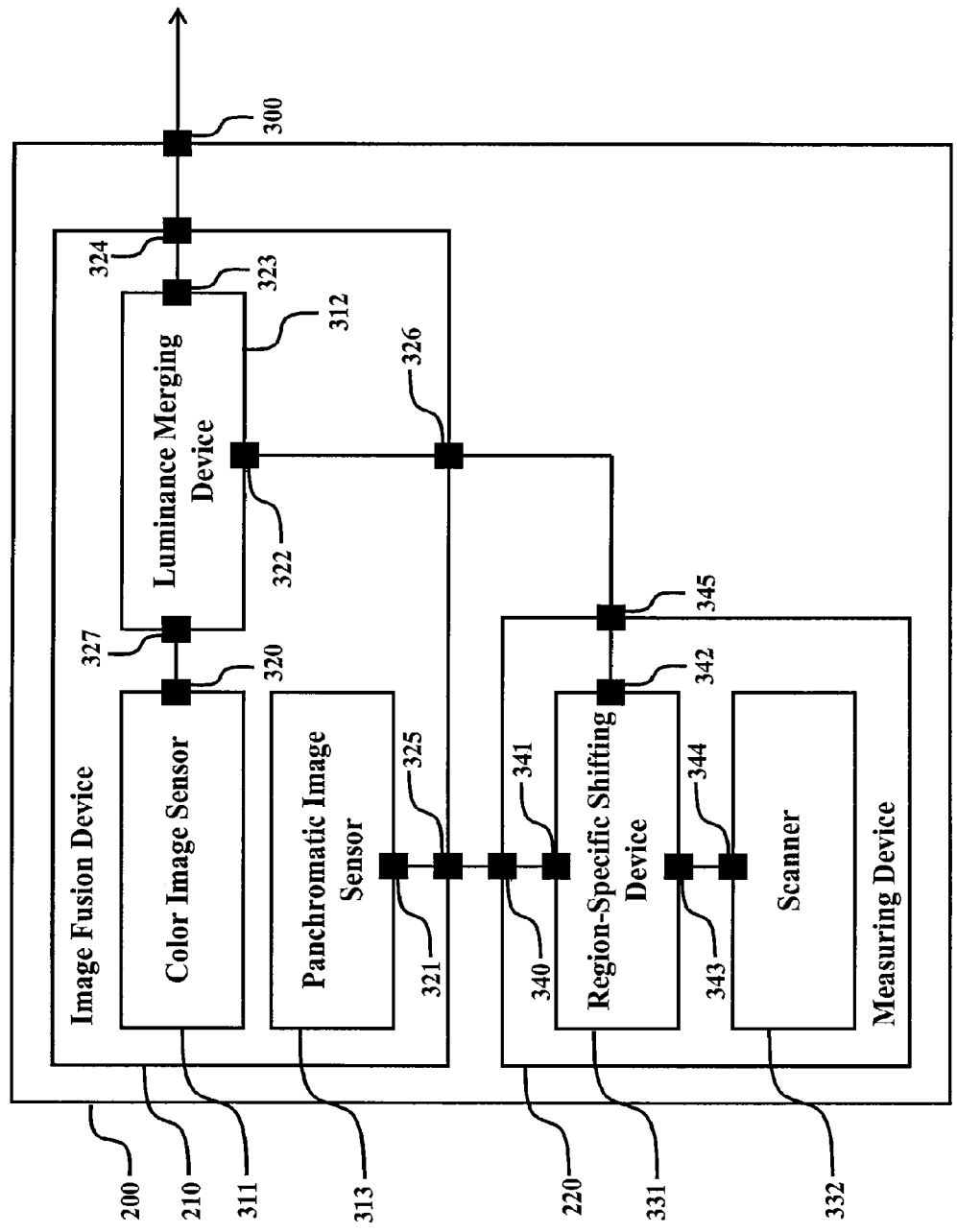
FIG. 3 illustrates one embodiment of a configuration of components in a high-resolution, variable depth of field image device.

FIG. 2 illustrates one embodiment of a high-resolution, variable depth of field image device 200. Image device 200 includes an image fusion device 210 and a measuring device 220. As illustrated in FIG. 3, an input 326 of image fusion device 210 is coupled to an output 345 of measuring device 220. An output 325 of image fusion device 210 is coupled to an input 340 of measuring device 220. Further, an output 324 of image fusion device 210 is coupled to an output 300 of image device 200.

Image fusion device 210 processes images received by a color image sensor 311 and a panchromatic image sensor 313 to produce a high-resolution color image of an object at output 300 of image device 200. In one embodiment, image fusion device 210 includes color image sensor 311, panchromatic image sensor 313, and a luminance merging device 312. Color image sensor 311 filters light from an image received by color image sensor 311 into a multi-spectra output having a luminance component and two chrominance components (e.g., YCbCr). The luminance component (Y) provides the brightness of objects in the image, while the chrominance components (CbCr) provide color information. An example of color image sensor 311 is a Bayer mosaic charge-coupled device (CCD), which is composed of a Bayer filter that passes red, green, or blue light to selected pixels. Alternatively, other color image sensors may be used, such as a Fovean X3 sensor (array of photosites containing stacked photodiodes) or a three-CCD sensor (three separate charge-coupled devices that measure red, green, and blue light separately).

Panchromatic image sensor 313 detects a luminance component from an image received by panchromatic image sensor 313. An example of panchromatic image sensor 313 is a black and white image sensor. Alternatively, other panchromatic image sensors may be used such as a grayscale image sensor. An output 321 of panchromatic image sensor 321 is coupled to an output 325 of image fusion device 210.

As illustrated in FIG. 3, an output 320 of color image sensor 311 is coupled to an input 327 of luminance merging device 312. Luminance merging device 312 replaces a luminance component from a color image (received by color image sensor 311) with a luminance component from a synchronous image received by panchromatic image sensor 313. Since the luminance component from panchromatic image sensor 313 has a higher resolution than the luminance component from color image sensor 311, the combination of the panchromatic luminance component with the color chrominance components produces a higher resolution color image than would be available if only image sensor 311 was used.

An example of luminance merging device 312 is a device that processes pan sharpening software to replace the luminance component from a color image with the respective luminance component from a panchromatic image. Pan sharpening software is known in the art; accordingly, a more detailed description is not provided. Alternatively, other image merging methods may be used such as a multi-resolution wavelet transform, a principal component analysis (PCA) transform, and an intensity-hue-saturation (IHS) transform. As illustrated in FIG. 3, an input 322 of luminance merging device 312 is coupled to an input 326 of image fusion device 210. An output 323 of luminance merging device 312 is coupled to an output 324 of image fusion device 210.

Figure 4:
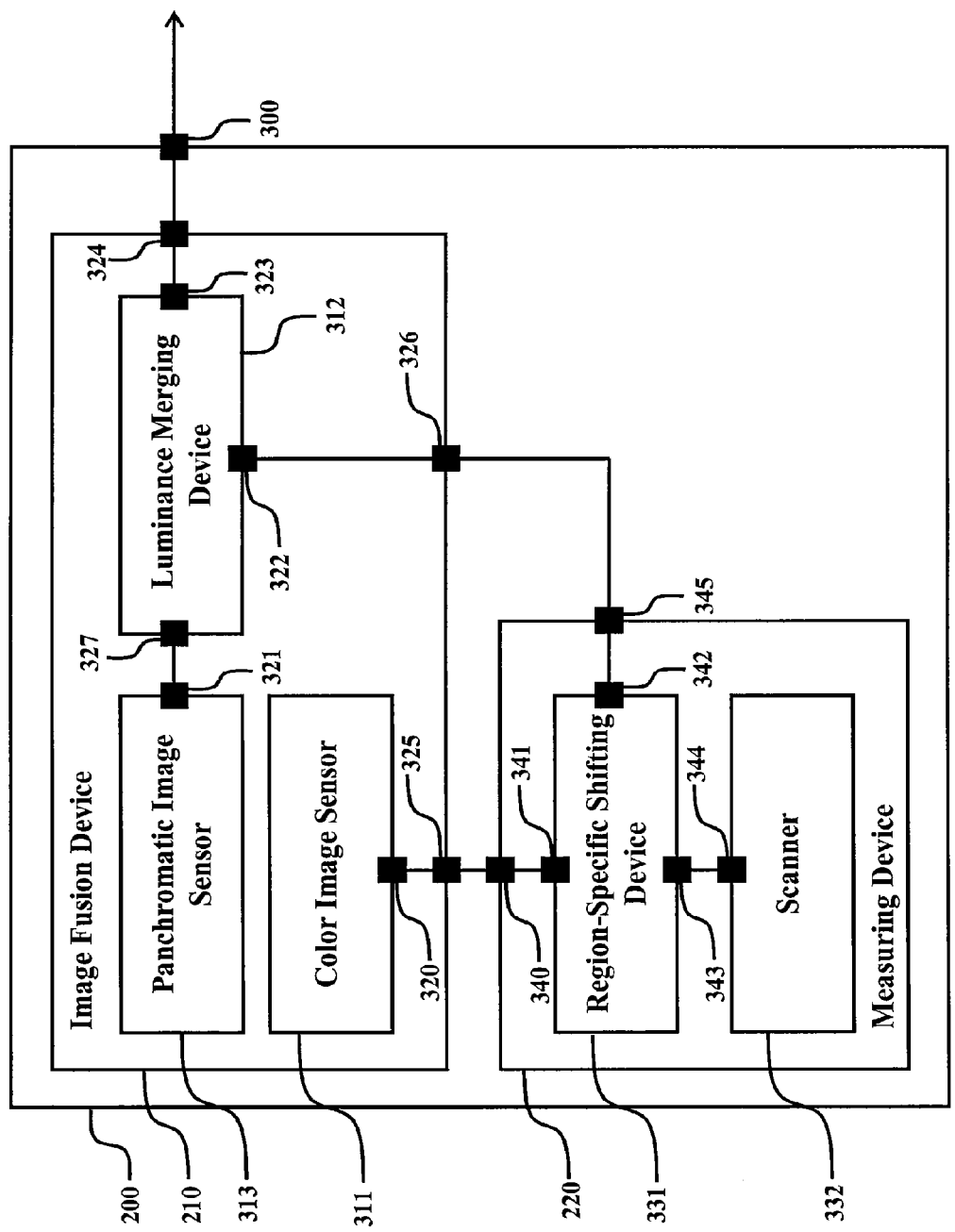
FIG. 4 illustrates another embodiment of a configuration of components in a high-resolution, variable depth of field image device.

FIG. 4 illustrates another embodiment of image fusion device 210. In FIG. 4, image fusion device 210 includes color image sensor 311, panchromatic image sensor 313, and luminance merging device 312. Output 321 of panchromatic image sensor 313 is coupled to input 327 of luminance merging device 312. As described with respect to FIG. 3, image fusion device 210 processes images received by color image sensor 311 and panchromatic image sensor 313 to produce a high-resolution color image of an object at output 300 of image device 200. Color image sensor 311, panchromatic image sensor 313, and luminance merging device 312 function in a similar manner to that described in FIG. 3.

Returning to FIG. 3, in one embodiment, measuring device 220 includes a region-specific shifting device 331 and a scanner 332. Region-specific shifting device 331 spatially shifts a luminance component from a panchromatic image (received by panchromatic image sensor 313) to a position correlating to a synchronous image received by color image sensor 311. Alternatively, in the embodiment illustrated in FIG. 4, region-specific shifting device 331 spatially shifts a luminance component from a color image (received by color image sensor 311) to a position correlating to a synchronous image received by panchromatic image sensor 313. An example of region-specific shifting device 331 is a device that is configured to process computer software to perform feature matching or a shift and variant transform. Alternatively, other region-specific shifting devices may be used, such that pixels in a panchromatic image may be adjusted to a position relative to a synchronously received color image.

Scanner 332 measures the distance from image device 200 to an imaged object. An example of scanner 332 is a laser scanner. Alternatively, other types of scanners may be used such as a sonic detection and ranging device (which uses sound waves for measurement) and a radar device (which uses radio waves for measurement). The distance measured by scanner 332 may be used by region-specific shifting device 331 to account for the effect of parallax due to a spatial difference between apertures of color and panchromatic image sensors 311 and 313, respectively.

Figure 5:
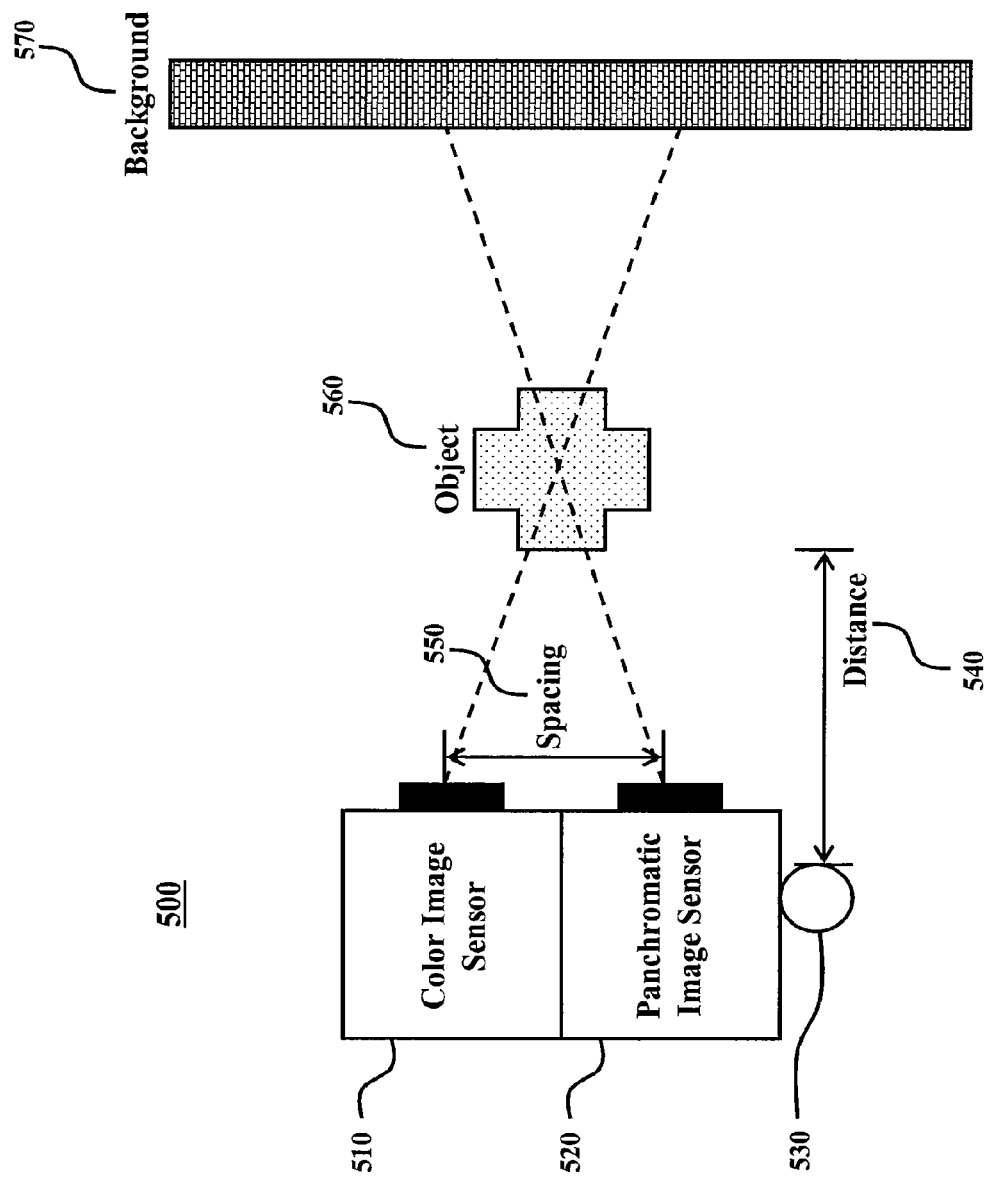
FIG. 5 illustrates two image sensors receiving an image of an object with a reference background.

For example, FIG. 5 illustrates a color image sensor 510 and a panchromatic image sensor 520 receiving an image of an object 560. A spacing 550 between apertures of image sensors 510 and 520 may cause parallax error due to a perceived shift of the imaged object 560 against a background 570. That is, color image sensor 510 may have a different perspective of imaged object 560 than the perspective of panchromatic image sensor 520 due to the angular position of object 560 as viewed by these image sensors. The effect of parallax may be accounted for by measuring a distance 540 between image sensors 510 and 520 and object 560. By measuring distance 540 with a scanner 530, the viewing angles between image sensors 510 and 520 and object 560 may be calculated using geometric calculations. With these measurements and calculations, a device, such as region-specific shifting device 331 in FIGS. 3 and 4, may be configured to spatially shift pixels from an image received by panchromatic image sensor 520 to form a resulting panchromatic image with a spatial relationship uniform to a synchronously received color image. Alternatively, the pixels from the synchronously received color image may be spatially shifted to form a resulting color image with a spatial relationship uniform to the panchromatic image.

As illustrated in FIGS. 3 and 4, an output 342 of region-specific shifting device 331 is coupled to an output 345 of measuring device 220. An input 341 of region-specific shifting device 331 is coupled to an input 340 of measuring device 220. Further, an input 343 of region-specific shifting device 331 is coupled to an output 344 of scanner 332.

Figure 6:
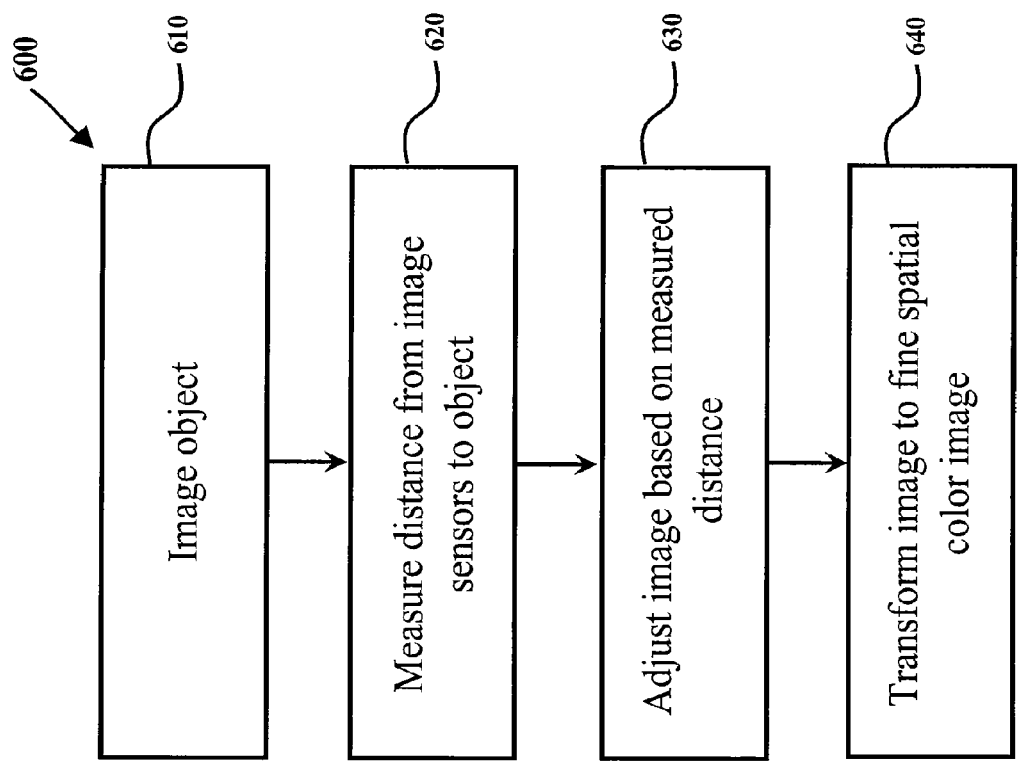
FIG. 6 illustrates one embodiment of a method of generating a high-resolution image in a wide depth of field environment.

FIG. 6 illustrates one embodiment of a method 600 to generate a high-resolution image in a variable depth of field environment. Method 600 may occur using, for example, image device 200. In step 610, an image of an object is received synchronously with a color image sensor and a panchromatic image sensor, such as color image sensor 311 and panchromatic image sensor 313 in FIGS. 3 and 4. In step 620, a distance from the image sensors to the object is measured. The distance may be measured using scanner 332, as illustrated in FIGS. 3 and 4.

In step 630, the image is adjusted based on the measurement in step 620. More specifically, the distance may be used to adjust the images to account for the effect of parallax, where feature matching or a shift and variant feature transform may be used in the adjustment. The effect of parallax is similar to that described with respect to FIG. 5.

In step 640, the image is transformed to a fine spatial color image of the object using a luminance component from the panchromatic image. The luminance component from the panchromatic image may be used to transform the color and panchromatic images to a fine spatial image of the object, as described with respect to FIGS. 3 and 4, where the fine spatial color image has a higher resolution than the original color image received by the color image sensor. The transformation of the image in step 640 may involve replacing the luminance component from the color image with a spatially-shifted luminance component from the panchromatic image. Alternatively, a spatially-shifted luminance component from the color image may be replaced with the luminance component from the panchromatic image.

Figure 7:
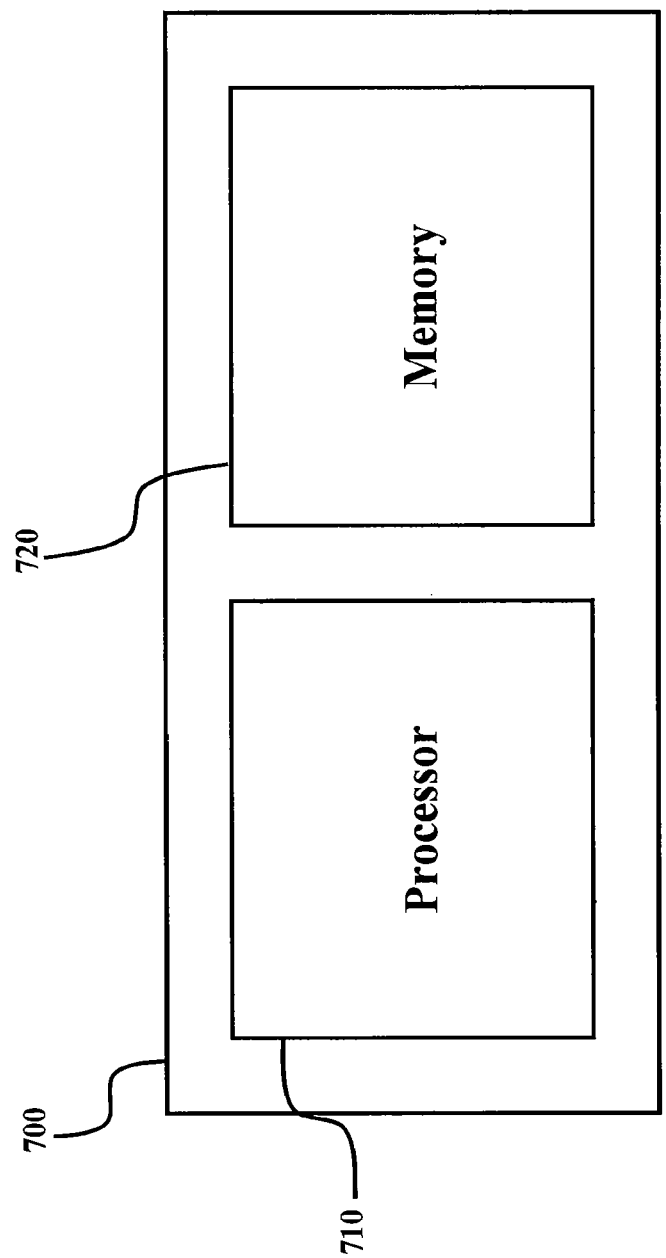
FIG. 7 illustrates one embodiment of a system implementing a high-resolution, variable depth of field image device.

FIG. 7 illustrates one embodiment of a system 700 incorporating a high-resolution, variable depth of field image device. System 700 includes a processor 710 and a memory 720. The representative signal processing described herein can be implemented in hardware, software, or some combination thereof. For instance, the signal processing functions can be implemented using computer processors, computer logic, application specific circuits (ASICs), digital signal processors, etc., as will be understood by those skilled in the arts based on the discussion given herein. Accordingly, any processor that performs the signal processing functions described herein is within the scope and spirit of the present invention.

Further, the signal processing functions described herein could be embodied by computer program instructions that are executed by a computer processor or any one of the hardware devices listed above. The computer program instructions cause the processor to perform the signal processing functions described herein. The computer program instructions (e.g., software) can be stored in a computer usable medium, computer program medium, or any storage medium that can be accessed by a computer or processor. Such media include a memory device such as a RAM or ROM, or other type of computer storage medium such as a computer disk or CD ROM, or the equivalent. Accordingly, any computer storage medium having computer program code that cause a processor to perform the signal processing functions described herein are within the scope and spirit of the present invention.

In reference to FIG. 7, memory 720 is in communication with processor 710 and stores processing instructions. In an embodiment of the present invention, these processing instructions direct processor 710 to perform the following functions: (1) synchronously image an object with color and panchromatic image sensors; (2) measure a distance from color and panchromatic image sensors to the object; (3) adjust the image based on the measured distance; and, (4) transform the image to a fine spatial color image of the object using a luminance component from the panchromatic image. The processing instruction for directing the processor to measure the distance from the image sensors to the object may include using a scanner, such as a laser scanner.

In one embodiment, the processing instruction for directing the processor to adjust the image based on the measured distance may include spatially shifting a luminance component from the image generated by the panchromatic image sensor to a position correlating to the image received by the color image sensor. Alternatively, the processing direction for directing the processor to adjust the image of the object may also include spatially shifting a luminance component of the image generated by the color image sensor to a position correlating to the image received by the panchromatic image sensor. In shifting the luminance component of either the color or panchromatic image, an angular position between the image sensors and the object may also be calculated as part of the processing instruction. The distance between the image sensors and the object and a distance between apertures of the image sensors may be used in the calculation of the angular position. As described with respect to FIG. 5, this angular position may be used to account for a perceived shift in position of an imaged object (with reference to a background) as viewed by the panchromatic and color image sensors.

In one embodiment, the process instruction for directing the processor to transform the image to a fine spatial color image of the object may include replacing a luminance component from the image generated by the color image sensor with the spatially-shifted luminance component from the panchromatic image. Alternatively, the process instruction for directing the processor to transform the image to a fine spatial color image of the object may also include replacing the spatially-shifted luminance component from the color image with a luminance component from the image generated by the panchromatic image sensor. It is advantageous to replace the color image luminance component with the panchromatic image luminance component since the panchromatic luminance component has a finer spatial resolution than the color luminance component and, therefore, a high-resolution color image may be generated.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. Accordingly, the breadth and scope of the present invention should not be limited by any of the above-described exemplary embodiments, but should be defined only in accordance with the following claims and their equivalents.

What is claimed is:

1. A method for generating a high-resolution image, comprising:
   receiving color image data and panchromatic image data obtained by synchronously imaging an object with color and panchromatic image sensors;
   receiving data indicating a measured distance from the color and panchromatic image sensors to the object; and
   generating an image of the object based on the measured distance to account for the effect of parallax due to a spatial difference between apertures of the color and panchromatic image sensors.

2. The method of claim 1, wherein generating an image comprises transforming the color and panchromatic images to a fine spatial color image of the object.

3. The method of claim 2, wherein transforming the color and panchromatic images comprises replacing a luminance component of the color image data with a spatially-shifted luminance component of the panchromatic image data.

4. The method of claim 2, wherein transforming the color and panchromatic images comprises replacing a spatially-shifted luminance component of the color image data with a luminance component of the panchromatic image data.

5. The method of claim 4, wherein spatially shifting the luminance component of the panchromatic image data comprises using at least one of feature matching or a shift and variant feature transform.

6. The method of claim 1, wherein generating the image comprises calculating an angular position between the color and panchromatic image sensors and the object, using the distance between the image sensors and the object and a spatial distance between apertures of the two image sensors.

7. A system for generating a high-resolution image, comprising:
   a processor; and
   a memory in communication with the processor, the memory storing a plurality of processing instructions that, when executed, cause the processor to perform operations comprising:
      receiving color image data and panchromatic image data obtained by synchronously imaging an object with color and panchromatic image sensors;
      receiving data indicating a measured distance from the color and panchromatic image sensors to the object; and
      generating an image of the object based on the measured distance to account for the effect of parallax due to a spatial difference between apertures of the color and panchromatic image sensors.

8. The system of claim 7, wherein the generating an image comprises transforming the color and panchromatic images to a fine spatial color image of the object.

9. The system of claim 8, wherein the transforming the color and panchromatic images comprises replacing a luminance component of the color image data with a spatially-shifted luminance component of the panchromatic image data.

10. The system of claim 8, wherein transforming the color and panchromatic images comprises replacing a spatially-shifted luminance component of the color image data with a luminance component of the panchromatic image data.

11. The system of claim 10, wherein the spatially shifting the luminance component of the panchromatic image data comprises using at least one of feature matching or a shift and variant feature transform.

12. The system of claim 7, wherein the generating the image comprises calculating an angular position between the color and panchromatic image sensors and the object, using the distance between the image sensors and the object and a spatial distance between apertures of the two image sensors.

13. A non-transitory computer readable storage medium having instructions stored thereon that, when executed, causes a processing device to perform operations comprising:
   receiving color image data and panchromatic image data obtained by synchronously imaging an object with color and panchromatic image sensors;
   receiving data indicating a measured distance from the color and panchromatic image sensors to the object; and
   generating an image of the object based on the measured distance to account for the effect of parallax due to a spatial difference between apertures of the color and panchromatic image sensors.

14. The non-transitory computer readable storage medium of claim 13, wherein the generating an image comprises transforming the color and panchromatic images to a fine spatial color image of the object.

15. The non-transitory computer readable storage medium of claim 14, wherein the transforming the color and panchromatic images comprises replacing a luminance component of the color image data with a spatially-shifted luminance component of the panchromatic image data.

16. The non-transitory computer readable storage medium of claim 14, wherein transforming the color and panchromatic images comprises replacing a spatially-shifted luminance component of the color image data with a luminance component of the panchromatic image data.

17. The non-transitory computer readable storage medium of claim 16, wherein the spatially shifting the luminance component of the panchromatic image data comprises using at least one of feature matching or a shift and variant feature transform.

18. The non-transitory computer readable storage medium of claim 13, wherein the generating the image comprises calculating an angular position between the color and panchromatic image sensors and the object, using the distance between the image sensors and the object and a spatial distance between apertures of the two image sensors.

* * * * *